United States Patent [19]
Yoshikawa

[11] Patent Number: 5,264,683
[45] Date of Patent: Nov. 23, 1993

[54] METHOD OF COLLATING PHOTOGRAPHIC PRINTS WITH PHOTOGRAPHIC FILM

[75] Inventor: Sumio Yoshikawa, Kanagawa, Japan

[73] Assignee: Fuji Photo Film Co., Ltd., Kanagawa, Japan

[21] Appl. No.: 770,812

[22] Filed: Oct. 4, 1991

[30] Foreign Application Priority Data

Oct. 4, 1990 [JP] Japan .................................. 2-267179
Oct. 6, 1990 [JP] Japan .................................. 2-268754
Oct. 11, 1990 [JP] Japan .................................. 2-272623

[51] Int. Cl.⁵ ............................................ G06F 15/20
[52] U.S. Cl. ..................................... 235/375; 235/376; 235/489; 235/494; 354/105; 354/109
[58] Field of Search ............... 235/375, 376, 489, 494; 354/105, 109

[56] References Cited

U.S. PATENT DOCUMENTS 4,791,279 12/1988 Signoretto ........................... 235/375
4,823,162 4/1989 Renn et al. ......................... 235/375
4,838,435 6/1989 Alexandre et al. ................. 354/105
5,093,684 3/1992 Crochetierre et al. ............. 235/375
5,159,385 10/1992 Imamura .............................. 355/40

Primary Examiner—William L. Sikes
Assistant Examiner—Scott A. Ouellette
Attorney, Agent, or Firm—Sughrue, Mion, Zinn Macpeak & Seas

[57] ABSTRACT

A process for collating photographic film with prints made therefrom. During a reception process of a photofinishing order, data indicative of a customer's ID number recorded on an envelope is recorded in a magnetic recording layer of a photographic film. During a printing process, the customer's ID number is read out from the magnetic recording layer, and is recorded on the rear of a corresponding photographic print. The customer's ID number on the photographic film read out from the magnetic recording layer is displayed on a display device, or is recorded in the form of manually readable symbols onto the photographic film or a cassette. In collating, the three customer's ID numbers are compared with one another, so as to judge the correspondence between the envelope and the photographic film and a set of photographic prints. If they correctly correspond to one another, the photographic film and the photographic print set are packed in the envelope. For automatic collation, the customer's ID number is recorded as a bar code on the envelope and the photographic prints.

27 Claims, 11 Drawing Sheets

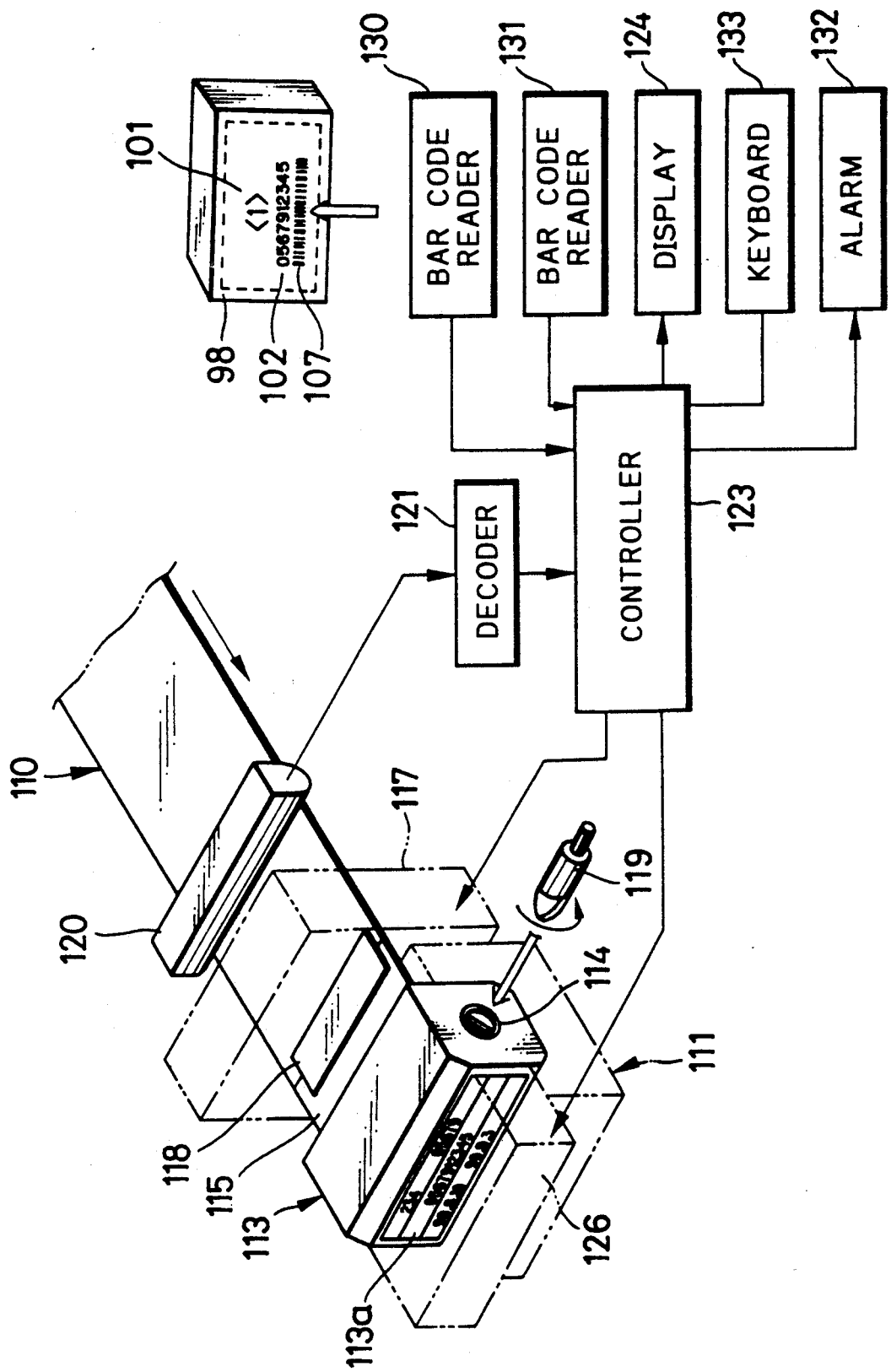

METHOD OF COLLATING PHOTOGRAPHIC PRINTS WITH PHOTOGRAPHIC FILM

BACKGROUND OF THE INVENTION

1. Field of the Invention

The present invention relates to a method of collating picture frames recorded on photographic film with prints made from these picture frames. In particular, the invention is a collating method which utilizes customer identification data recorded on a magnetic recording layer of the photographic film, hereinafter referred to as film ID data, and customer identification data recorded on photographic prints, hereinafter referred to as print ID data.

2. Description of the Related Art

When an exposed photographic film is forwarded to an agency for photofinishing, the agency writes the name of the customer, the content of ordered processing and other relevant information on a prescribed customer's order envelope, and packs the exposed film in the envelope. The envelope containing the film is forwarded to a photofinishing laboratory, hereinafter called simply a photo-lab, wherein a pair of ID check labels having the same ID number, e.g. 4-digits of numeric data, recorded thereon are generated and placed onto the exposed film and the envelope respectively.

Thereafter, the exposed film is subjected to development and printing. Collation between a developed film and a set of prints made from the film is performed in a conventional manner. A first print of the set is compared with a leading one of the picture frames of the film, or original frames, so as to determine whether the first print contains the same picture as the leading original frame. Next, the last print in the set is compared with a trailing original frame of the same film so as to check the identity thereof in a similar manner. When each pair of pictures is determined to be identical, it is judged that the print set correctly corresponds to the film. Then, the ID check label on the film and that on the envelope are compared with each other so as to pack the film and prints collated with each other into the corresponding envelope having the same ID number as the film. The envelopes containing the films and prints are then delivered to the proper customers.

Because the above-described conventional collating method needs to view pictures on photographic film and compare them with print pictures, it is cumbersome and time consuming. Furthermore, because it is necessary to place the ID check labels onto the photographic film and envelopes for collating with each other, processing time and labor is increased.

Recently, photographic film has been suggested, for example, in International Publication No. WO 90/04205, which has a magnetic recording layer on a side of the base film opposite a photosensitive emulsion layer. The magnetic recording layer is used to record film type (positive or negative, sensitivity, available frame number, film maker) and other photographic data.

SUMMARY OF THE INVENTION

A principal object of the present invention is to provide a collating method by which photographic prints can be correlated with photographic films without the need for comparative viewing.

Another object of the present invention is to provide a collating method by which it is possible to correlate a photographic film and a set of prints with a customer's order envelope.

A further object of the present invention is to provide a method which facilitates preparation for the above-mentioned collation.

The above and other objects are achieved by recording customer identification data on a magnetic recording layer of a photographic film, reading the customer identification data from the magnetic layer and recording the same identification data on prints made from the photographic film during printing. The identification data of the photographic film is then compared with the identification data recorded on photographic prints. If the two sets of data are determined to be identical, the prints and film are collated together as a set.

The film ID data can be recorded on the magnetic recording layer of the photographic film by means of a magnetic recorder built in a camera or a reception unit installed in a photofinishing agency or a photolab. The film ID data consists of numerals, characters, symbols, or the like, and is recorded in individual magnetic recording areas allocated to respective picture frames, or in a magnetic recording area disposed in one or each end of a photographic film.

According to a first embodiment, the print ID data consist of manually readable symbols, which are printed on the rear side of photographic paper or in blanks between print frames during printing of the pictures. The print ID data may be recorded on every print for each set, or on the first print of each set, or on the first and last prints of each set. The film ID data is read from the magnetic recording layer of the photographic film, and is displayed on a display device. In this way, it is possible to manually compare the displayed film ID data with the print ID data so as to confirm that the prints and film are correctly correlated. Thereafter, customer's identification data provided on respective customer's order envelopes, hereinafter referred to as envelope ID data, are compared with the film ID data, so that a film and a corresponding set of prints are inserted in the envelope having the same ID data.

According to a second embodiment, the film is also recorded with manually readable symbols as film ID data disposed in a leading or trailing end thereof, or on the periphery of a film cassette therefor. The symbols may be recorded on the film by means of a punch unit, an optical printing device, or a mechanical printing device. When collating, the symbols recorded in the photographic film or on the film cassettes are compared with the symbols recorded for each set of prints, so as to check the identity of these symbols.

According to a third embodiment, the print ID data consists of mechanically readable symbols. A collating device optically reads the symbols from the print, and magnetically reads the film ID data from the magnetic recording layer of the film by means of a magnetic read head, so as to determine whether these data sets are identical. If not, an alarm or the like is generated to warn of the error. By recording mechanically readable symbols as envelope ID data on each envelope, fully automatic collation of photographic film photographic prints and envelopes with each other is achieved.

According to the present invention, since a photographic film can be collated with a set of prints with reference to film ID data recorded on the film and print ID data recorded at least one print of the set, it is unnecessary to view the pictures on the photographic film and those of the finished prints as in a conventional method. Accordingly, the collation can be quickly and precisely performed. Since the ID data is recorded as mechanically readable symbols on prints and envelopes, it is possible to automatically correlate a photographic film with a set of prints as well as with an envelope.

BRIEF DESCRIPTION OF THE DRAWINGS

The above and other objects and advantages of the present invention will become apparent from the following detailed description of the preferred embodiments when read in conjunction with the accompanying drawings, wherein:

FIG. 13 schematically shows a film winding device for the embodiment of FIG. 11.

DETAILED DESCRIPTION OF THE PREFERRED EMBODIMENTS

Figure 1:
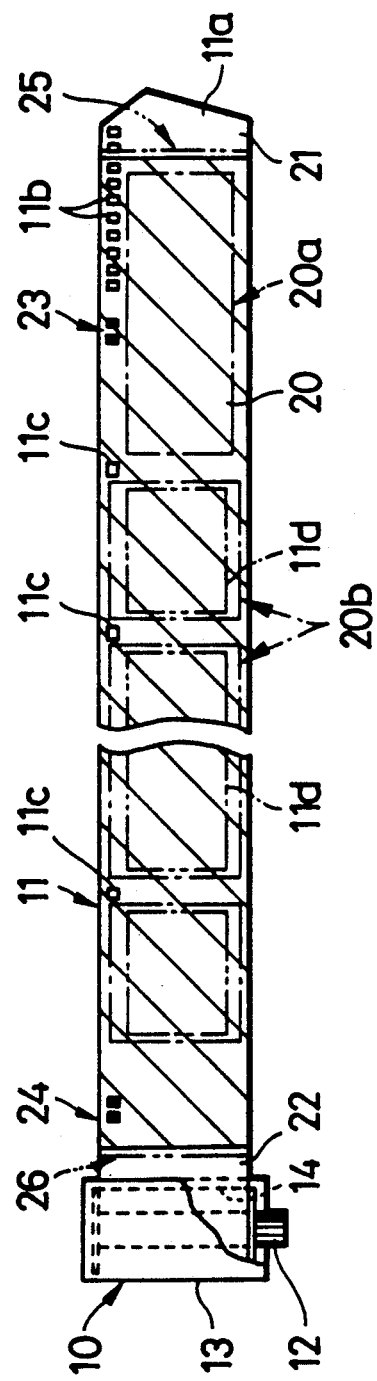
FIG. 1 is a plan view showing a film cassette from which an exposed photographic film is pulled out.

In FIG. 1, film cassette 10 receives an exposed photographic film, for example, exposed negative film 11 coiled around spool 12 of cassette shell 13. Cassette shell 13 has a film leader propeller function so that leader portion 11a of negative film is propelled out of cassette shell 13 through film passage slit 14 by rotation of spool 12 in an unwinding direction. The film leader propeller function is achieved by clamping film roll 11 on both axial ends thereof with a pair of flanges of spool 12, or by holding the outermost periphery of the negative film roll with ridges formed inside cassette shell 13, such that film roll 11 will rotate with spool 12.

Film leader 11a has a triangular end so as to aid in directing film leader 11a through film passage slit 14. Film leader 11a is also formed with a plurality of perforations 11b, disposed at regular intervals, which engage with a sprocket (not shown) disposed in a film passageway of a camera, so as to transport film leader 11a into a film wind-up chamber of the camera. Film 11 is further formed with frame positioning perforation 11c in association with each original frame 11d. Frame positioning perforations 11c are mechanically, e.g. optically, detected in cameras or printers for positioning of each original frame.

Figure 4:
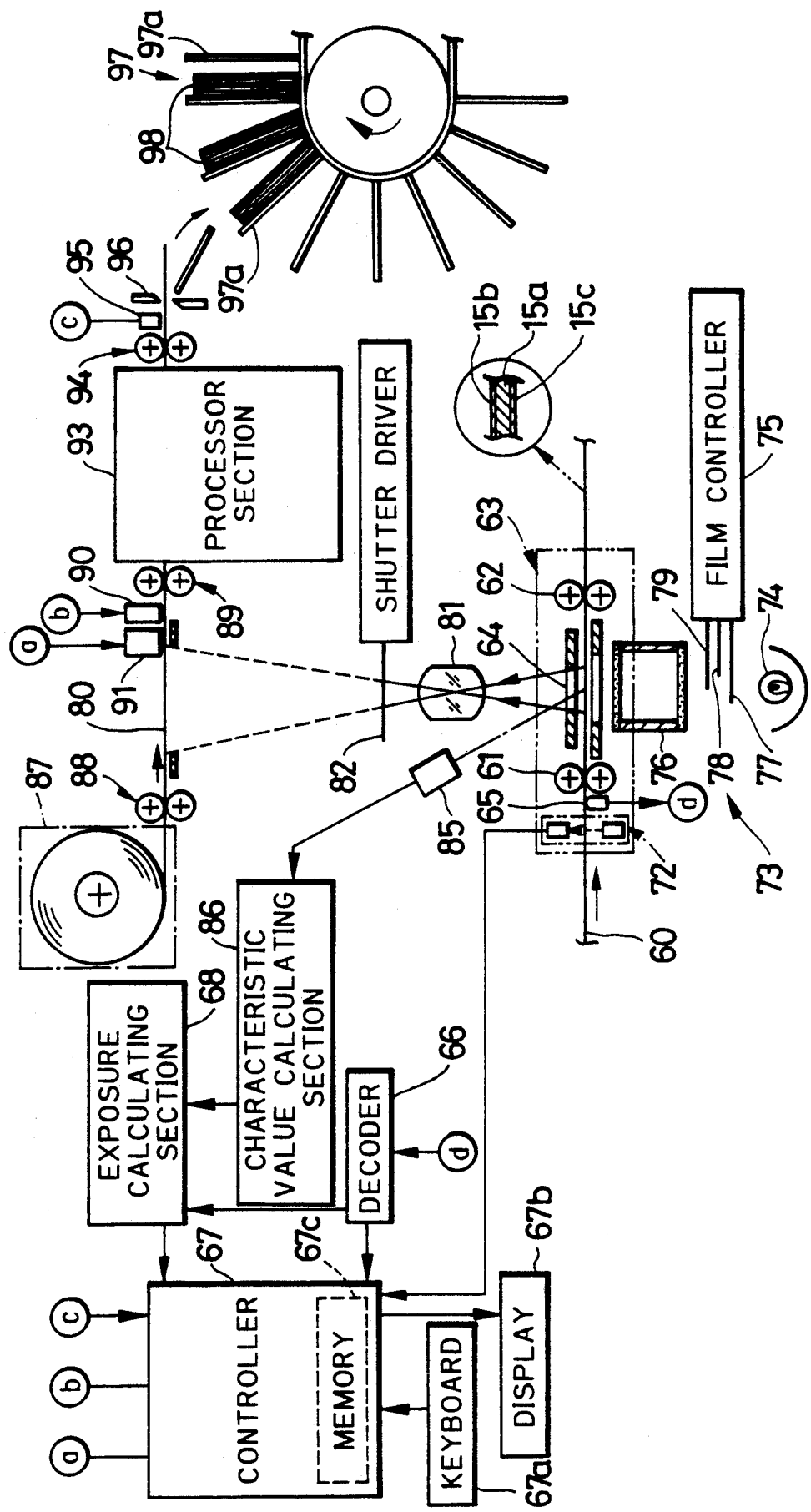
FIG. 4 schematically shows a printer-processor which can record a customer's ID numbers on photographic paper.

As shown in FIG. 4, film 11 has photosensitive emulsion layer 15b on one side of base film 15a, and transparent magnetic recording layer 15c on the opposite side thereof. Magnetic recording layer 15c is recorded with film data and photographic data during manufacturing and photographing, respectively. Magnetic recording layer 15c is further recorded with ID data for identifying the customer, agency, photo-lab or the like, and print order data and the like when the exposed negative film is received in a lab for photofinishing. The ID data consist of, for example, numerals, characters, symbols, or the like. According to this embodiment, an ID number is used as the ID data, which is formed by combining a 5-digit agency number and a 5-digit reception number. It is possible to use a part of the ID number, for example, numerals of the least significant 4-digits, that is, those of the least significant 4-digits of the reception number, so as to reduce the number of digits and thus reduce the time for collation. It is also possible to laminate both magnetic recording later 15c and photosensitive emulsion layer 15b on one side of base film 15a.

Magnetic recording layer 15c is provided on the whole rear side surface of film 11, but areas 21 and 22 positioned on the leading and trailing ends of the negative film are not used for recording. Area 20 extending between areas 21 and 22, which is hatched in FIG. 1, can be used for recording. In order to discriminate recording area 20 from non-recording areas 21 and 22, start mark 23 and end mark 24 are recorded in opaque ink. Furthermore, by optically detecting marks 23 and 24, the leading end and the trailing end of the film are cut away along cutting lines 25 and 26 formed in non-recording areas 21 and 22. According to the first embodiment, start mark 23 and end mark 24 are each formed by two rectangular marks spaced at a predetermined distance, such that marks 23 and 24 may not be mistaken with perforations 11b and 11c. Marks 23 and 24 may also be formed by holes, notches, or the like.

Recording area 20 is divided into general data recording area 20a for recording data relating to the entire film 11, and individual data recording areas 20b allocated for recording data specific to each individual original frame. General data recording area 20a is disposed between leading end 11a and the leading one of original frames 11d, whereas individual recording areas 28 are disposed corresponding to respective of original frames 11d. General data recording area 20a is recorded with film data such as film speed, film maker, film type, frame number and the like, as well as a customer ID number and a photo-lab ID number. In individual data recording areas 20b, photographic data such as light source data, data relating to flash, subject position and distance data, cropping data, and the like, as well as print data such as print-exposure data and the number of extra prints desired. It is to be noted that cropping is a trimming and enlarging technique, whereby only a predetermined area of an original frame is enlarged at a predetermined magnification so as to make a print of a regular size but having an enlarged picture as if it were taken by a lens of a larger focal length.

Figure 2:
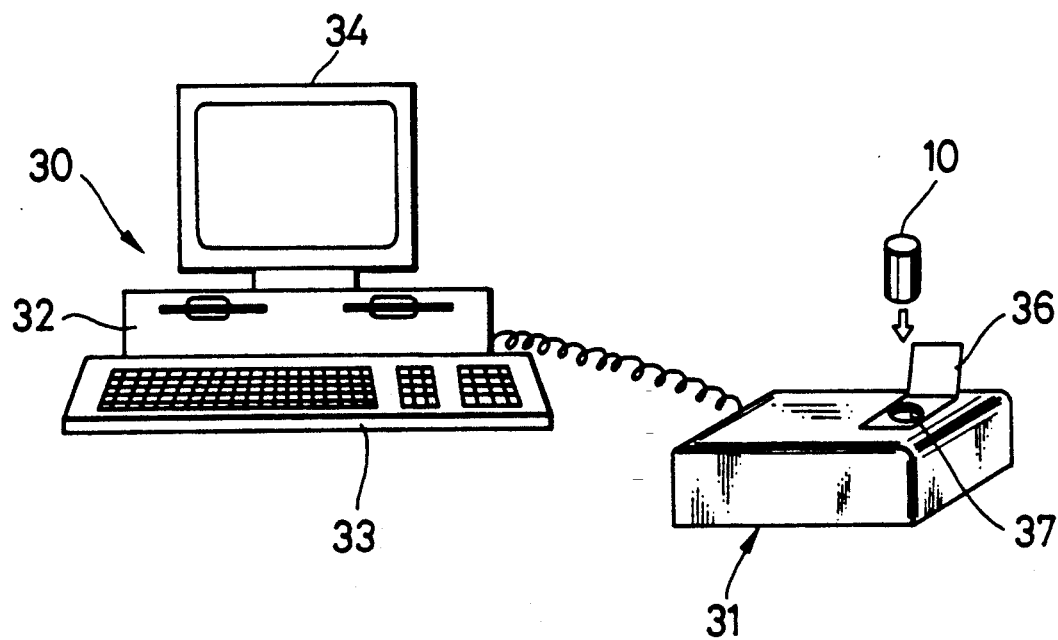
FIG. 2 is a perspective view of a reception unit.

A reception unit shown in FIG. 2, is installed in an agency or a photo-lab, and consists of personal computer 30, or the like, for entering reception data and magnetic recording device 31 for recording the reception data on recording area 20. The reception data includes a customer ID number, a photo-lab ID number, the number of prints, the size and surface type of prints, and the like, which are manually entered through keyboard 33 of personal computer 30 with reference to written information on the envelope. Personal computer 30 consists of controller 32, display 34, and keyboard 33. Magnetic recording device 31 has cassette holder 37 closed by openable lid 36. Film cassette 10 containing exposed film 11 is inserted axially in cassette holder 37. Lid 36 covers film cassette 10 received in cassette holder 37 in light-tight fashion. Cassette holder 37 is provided with a receiving chamber which has approximately the same shape as the contour of film cassette 10, so that film cassette 10 is prevented from rotating while accommodated in cassette holder 37.

Figure 3:
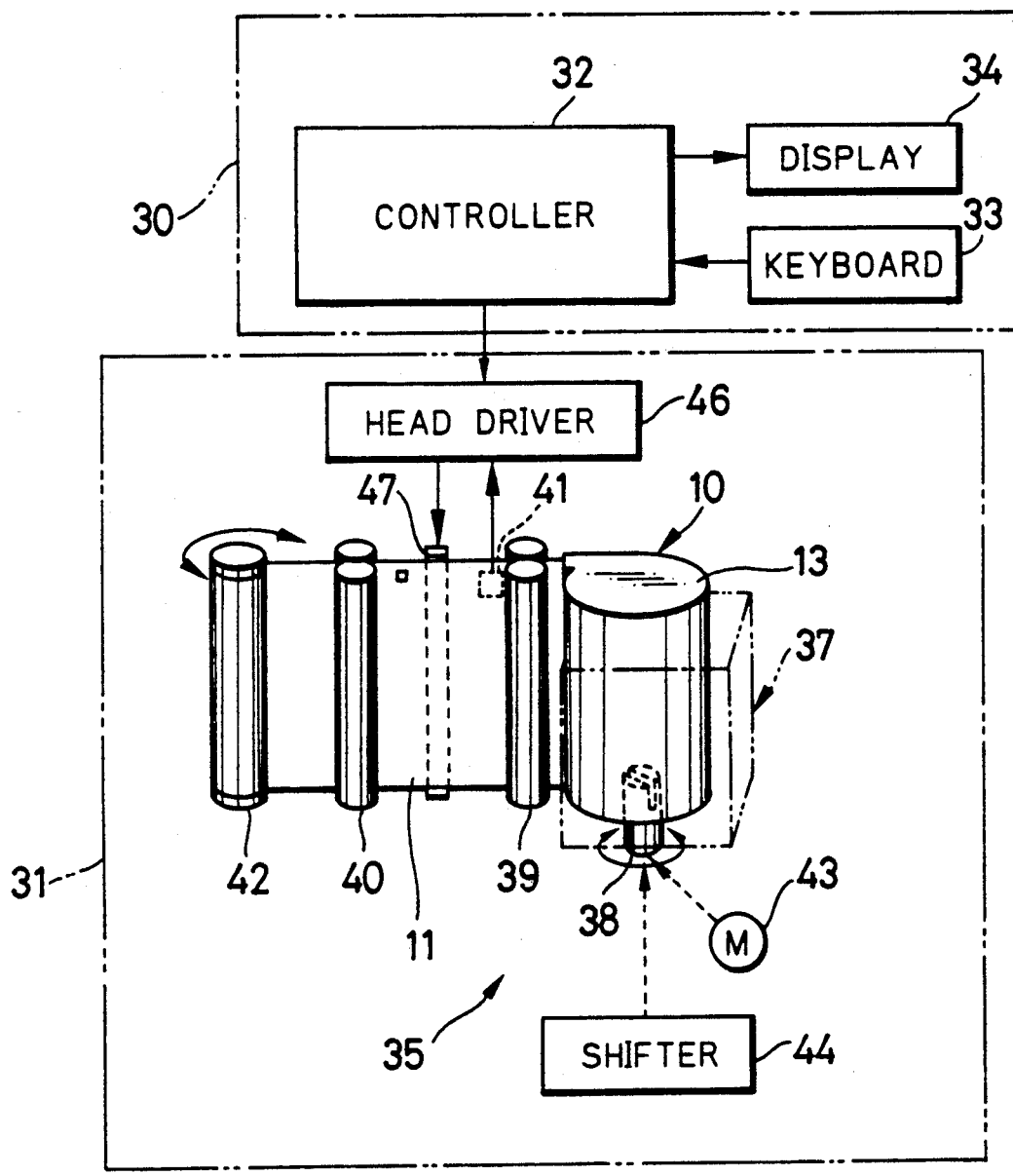
FIG. 3 schematically shows the construction of the reception unit of FIG. 2.

As shown in FIG. 3, magnetic recording device 31 has film pull-out section 35 therein, which consists of spool drive shaft 38, two pairs of film pull-out rollers 39 and 40, film leader sensor 41, film winding shaft 42, and motor 43. Spool drive shaft 38 is moved by shifter 44 so as to couple with spool 12 of cassette shell 13 when film 11 is to be unwound or rewound. When spool drive shaft 38 rotates spool 12 in the unwinding direction, film leader 11a is fed out of cassette shell 13. When film leader sensor 41 detects that film leader 11a has passed through first film pull-out roller pair 39, shifter 44 is activated to move spool drive shaft 38 away from spool 12 so as to decouple spool drive shaft 38 and spool 12. Thereafter, film leader 11a is pulled out by first film pull-out roller pair 39, is transported through second film pull-out roller pair 40, and is caught by wind-up shaft 42. Wind-up shaft 42 is driven by a motor (not illustrated) to wind negative film 11 thereon.

Controller 32 controls display device 34 according to a program stored in ROM so that reception data entered through keyboard 33 is displayed on display device 34 and thereafter is sent to head drive section 46 of recording device 31. Head drive section 46 drives magnetic recording head 47 so as to record the reception data on film 11, while film 11 is being wound onto wind-up shaft 42. Accordingly, the customer ID number, photo-lab ID number, and print order data are recorded onto general data recording area 20a, and print relating to each original frame is recorded onto individual data recording areas 20b.

After the reception data is magnetically recorded, shifter 44 moves spool drive shaft 38 so as to couple again with spool 12 of film cassette 10. When spool drive shaft 38 is rotated in a reversed direction, the direction opposite to the unwinding direction, and film pull-out roller pairs 39 and 40 are idled, film 11 is rewound into cassette shell 13. After rewinding, film cassette 10 is ejected from cassette holder 37 by moving spool drive shaft 38 upward.

FIG. 4 illustrates the development process. film cassette 10, after being subjected to the above-described reception process, is subjected to developing, wherein exposed film is cut along cutting line 25 Then, the entire length of film 11 is pulled out from cassette shell 13, and cut along cutting line 26 (see FIGURE Film is then developed in a conventional film processor to yield developed negative film 60. Developed negative film 60 is transported by two pairs of feed rollers 61 and 62 toward printing aperture 64 of film carrier 63. During transporting developed negative film 60, magnetic read head 65 reads magnetic data from recording area 20 and outputs a signal. The magnetic signals are converted by decoder 66 into the above-mentioned data, which is then sent to controller 67 and print-exposure calculating section 68.

Film carrier 63 detects frame positioning perforations 11c by means of perforation sensor 72 while developed negative film 60 is transported, and transports negative film 60 by a constant amount with reference to each detected perforation 11. Accordingly, each original frame to be printed is properly placed in printing aperture 64. Light source section 73, disposed below film carrier 63, consists of light source 74, filter controller 75 and diffusion box 73. Filter controller 75 inserts color filters 77, 78, and 79 into the printing light path so as to adjust intensity and color balance of the printing light according to a calculated print-exposure. Diffusion box 76 diffuses the printing light passing through color filters 77, 78, and 79. Above film carrier 63 is disposed printing lens 81, for forming an image of the original frame to be printed on a photosensitive emulsion surface of color paper 80, and shutter 82 for controlling print-exposure time.

Scanner 85 is disposed diagonally above film carrier 63, so as to measure light passing through the respective pixels of the original frame in film carrier 63 by the three color separation method. The light measurement data of each pixel is sent to characteristic value calculating section 86, so as to calculate characteristic values necessary for determining print-exposure. The characteristic values are sent to print-exposure calculating section 68, which then calculates a print-exposure based on these characteristic values, photographic data and negative inspection data entered as needed, in accordance with a conventional exposure calculation formula. The calculated print-exposure is sent to controller 67.

Color paper 80 is stored in form of a roll in magazine 87, and is set, by two pairs of paper feed rollers 88 and 89, in an exposure position. Near the exit of exposure position, printing machine 90, a mechanical printer for instance, and punch unit 91 are disposed.

Controller 67 consists of a conventional microcomputer or the like, and has keyboard 76a for entering various commands, or the like, and display 67b for displaying the entered commands. Controller 67 determines respective set positions of color filters 77, 78, and 79 based on print-exposure using a conventional filter calibration curve, and controls filter controller 75 corresponding to the determined set positions. Controller 67 also controls the shutter according to the print-exposure. Controller 67 stores the customer ID number, that is read by magnetic head 65, in memory 67c, so that mechanical printer 90 prints the stored customer's ID number, for example in form of ink dot pattern, on the rear of the first print frame made from the leading original frame of negative film 60. Mechanical printer 90 also prints frame numbers on the rear of respective print frames. The frame number printing may be performed by optically reading frame number bar codes disposed on one side edge of the negative films. Instead of the conventional frame number bar codes, it is possible to read magnetically recorded frame number data. In addition, the customer ID number can be printed on every print frame, or on the first and last print frames. Controller 67 actuates punch unit 91 based on sort mark signals, so as to record sort marks and cut marks on color paper 80. It is to be noted that the customer ID number stored in memory 67c is cleared upon recording a sort mark.

Processor section 93 develops exposed color paper 80. Near the paper exit of processor section 93, there are disposed a pair of paper feed rollers 94, mark sensor 95 for detecting sort marks and cut marks, and cutter 96. Cutter 96 cuts color paper 80 into individual prints at positions at which cut marks are formed, based on cut mark detection signals. Sorter section 97 moves respective sorting stacks 97a by one step each time mark sensor 95 outputs a sort mark detection signal. Accordingly, a set of prints 98 is sorted onto one of stacks 97a.

Figure 5:
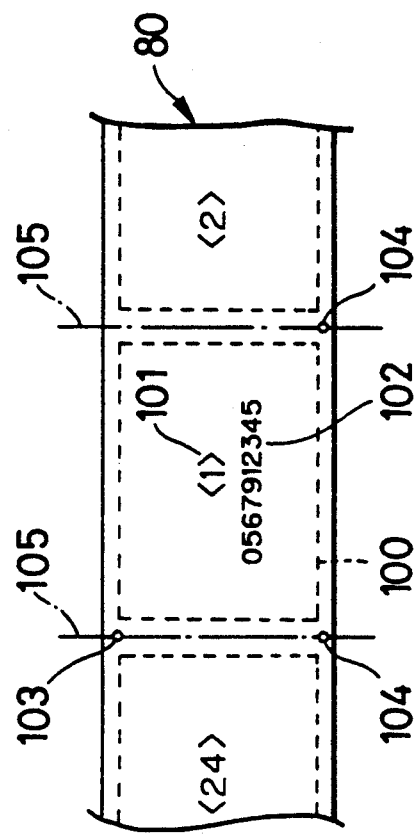
FIG. 5 shows a rear side of photographic paper having the customer's ID number recorded thereon.

In FIG. 5, first print frame 100, corresponding to the leading original frame of individual negative film 60, is printed on color paper 80. On the rear of first print frame 100, frame number 101 and customer ID number 102 are printed. Sort mark 103 and cut mark 104, in the form of punch holes, are recorded in blanks on the left and right sides of first print frame 100. Color paper 80 is cut into individual prints along cutting lines 105 extending laterally through cut marks 104.

Figure 6:
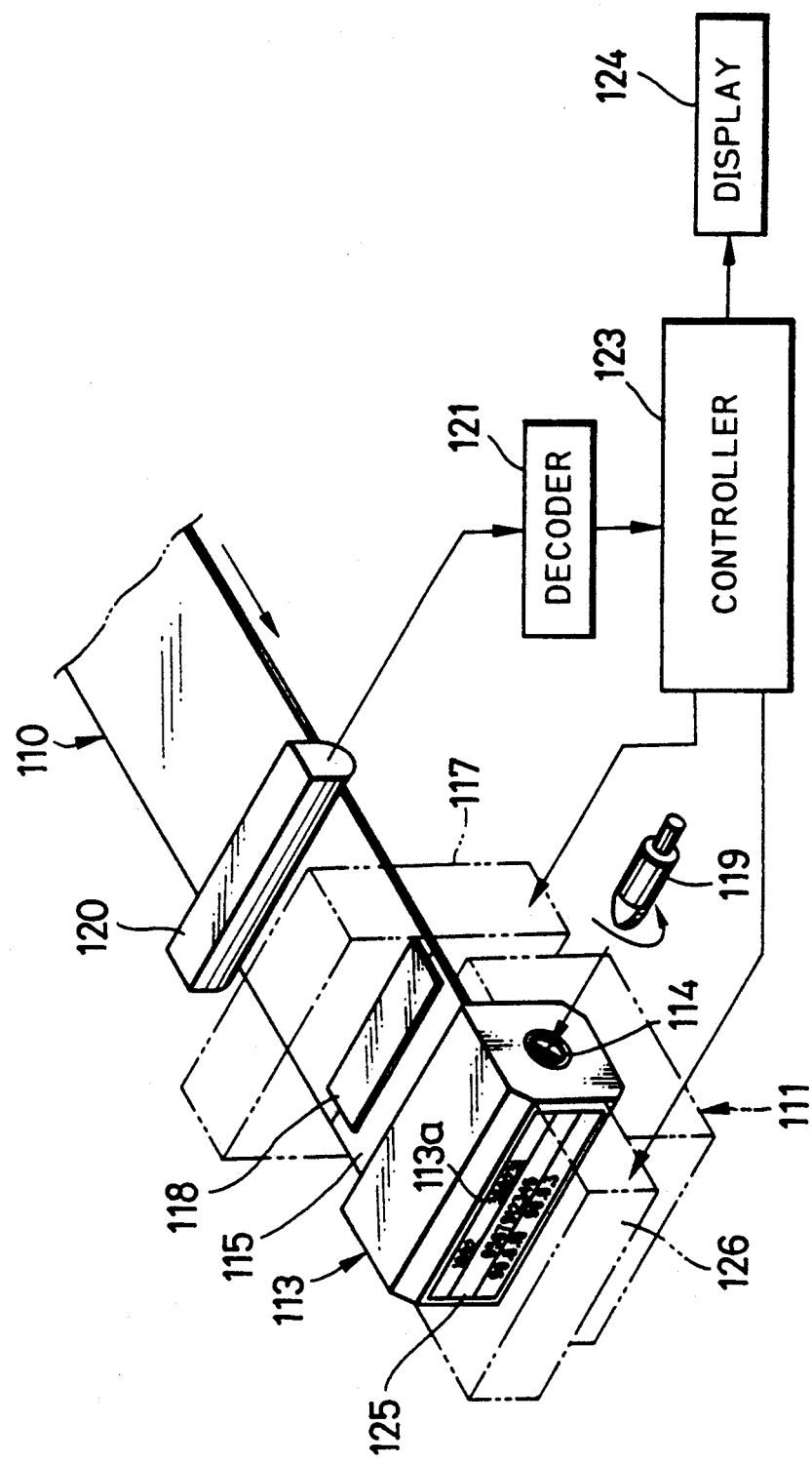
FIG. 6 shows a device for winding a developed film into a cassette after printing.

FIG. 6 shows a winding device for winding negative films into respective cassettes after printing. Cassette holder 111 holds empty storage cassette 113 having spool 114 to which one end of connecting tape 115 is fitted. The other end of connecting tape 115 protrudes outwardly from storage cassette 113, and is set in a connecting position of splicer 117. Splicer 117 connects the protruding end of connecting tape 115 with the trailing end of printed negative film 110 by means of splice tape 118. Spool drive shaft 119 engages with an end of spool 114 and rotates spool 114 in a direction so as to wind up film 110. Magnetic head 120 is disposed in the transporting path of negative film 110, so as to read magnetic signals from general data recording area 20a. Decoder 121 converts these signals into a customer ID number, and other data, and sends them to controller 123. Controller 123 displays the customer's ID number on display device 124, for example liquid crystal display, CRT, or the like. Controller 123 sends data on photographing date, developing date, photo-lab ID number and customer's ID number, which are read by magnetic head 110, to printing machine 126. Printing machine 126 prints the data in data entry column 113a on storage cassette 113. In order to provide a surface of data entry column 113a that is flat, storage cassette 113 is preferably of a polygonal shape. Although storage cassette 113 is a cassette made specifically for receiving film after printing, it is also possible to re-use an empty cassette from which an exposed film has been removed.

Figure 7:
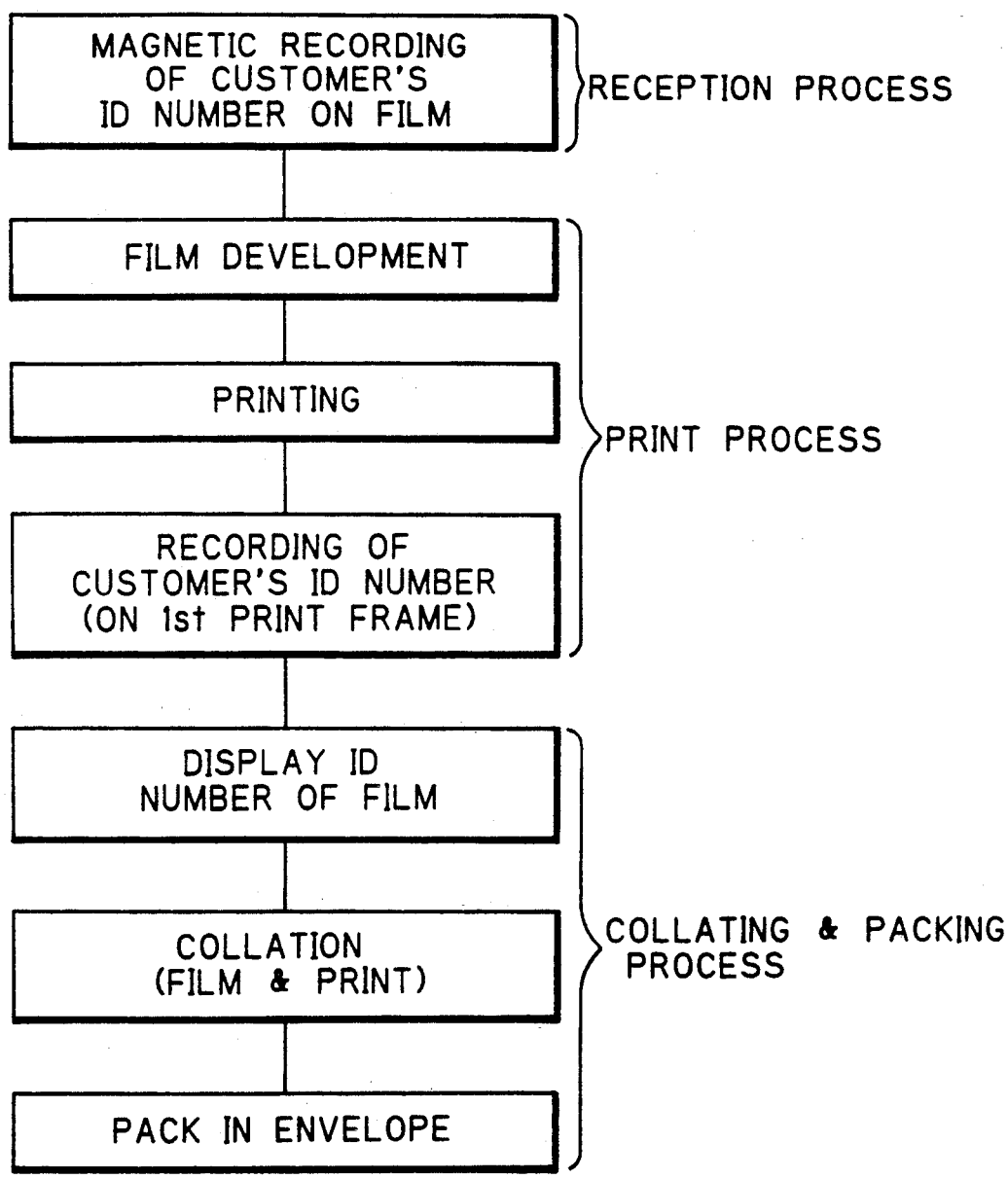
FIG. 7 is a flowchart explaining a procedure of collation between photographic prints and photographic film.

The operation of the above-described embodiment will now be described with reference to FIG. 7. Film cassette 10 containing exposed negative film 11 is forwarded to an agency, or lab, for photofinishing. In the agency, the name and address of the customer, the content of the order, and the like, are written on an order envelope which is previously printed with a customer ID number unique to this envelope. Thereafter, film cassette 10 is packed in the envelope, and is sent to a photo-lab, in the case of a separate agency for receiving the order. In the photo-lab, film cassette 10 is taken out from the envelope and is set in magnetic recording device 31 of the reception unit shown in FIG. 2. Thereafter, reception data is entered in the reception unit through keyboard 33 with reference to the customer ID number and the contents of the print order written on the envelope. The reception data is then displayed on display device 34, so that the operator can confirm the reception data. After confirmation, magnetic head 41 records the reception data on magnetic recording areas 20 while exposed negative film 11 is being pulled out from cassette 10.

After the reception process, film cassette 10 is set in the film processor shown in FIG. 4, wherein exposed negative film 11 is pulled out from cassette shell 13 and cut off along cutting lines 25 and 26. The separated negative film 11 is then transported through a series of processing tanks for development. Developed film 60 is set in film carrier 63 of the printer-processor. Film carrier 63 advances developed film 60 by one frame upon each actuation of a frame advancing key of the keyboard. During this one-frame advancing operation, the data recorded in general data recording area 20a of developed film 60, such as the customer ID number and film type data, are read to be sent to controller 67. The individual data about each original frame to be printed (photographic data such as light source data and primary subject position data) are read out from individual data recording areas 28. The individual data is sent to exposure calculation section 68 and controller 67.

Scanner 85 measures three color densities of each pixel of the original frame located in the printing position, so as to detect characteristic values in characteristic value calculating section 86. Based on these characteristic values, the exposure calculating section 68 calculates exposure amounts for the respective colors. When calculating the exposure amounts, correction data entered through keyboard 33 as well as the above-mentioned photographic data, and the like, are used to determine an optimum exposure amount for each color. Then, filter controller 75 controls color filters according to the determined exposure amounts, so that the image of original frame 11 is printed on color paper 80 in a proper manner. On the back of surface print frame 100 of a set of prints recorded on color paper 80, corresponding frame number 101 and corresponding customer's ID number 102 are printed in ink by printer 90. Punch unit 91 punches out sort mark 103 and cut marks 104.

Additional original frames of negative film 60 are printed in the same manner as above. After completion of printing of a strip of negative film 60, another strip of negative film is set in film carrier 63 for printing original frames thereof onto color paper 80. Printed color paper 80 is developed in processor 93, and is cut by cutter 96 along cutting lines 105 at cut marks 104. Cut prints 98 are then sent to stacks 97a of sorter 97. While cutting color paper 80, sorter 97 is moved by one stack upon each detection of sort mark 103 by mark sensor 95. In this way, prints 98 are sorted corresponding to each associated negative film.

After printing, negative film 110 is wound up into empty storage cassette 113 as shown in FIG. 6. During winding, magnetic head 120 reads customer ID number from recording area 20, so as to display it on display device 124. Printing machine 126 prints the photographing date, developing date, photo-lab ID number, as well as customer ID number 125, in data entry column 113a on storage cassette 113. Operator 124 compares customer ID number on display device 124 with print ID number 102, that is, the customer ID number printed on the rear of the first print of a set. If these numbers are identical, this set of prints 98 and film 110 wound in storage cassette 113 are packed in the envelope that has the corresponding ID number.

It is also possible to compare print ID number 102 with customer ID number 125 on storage cassette 113, instead of the customer's ID number on display 125, for collating purposes. The film ID number may be punched in film 11, may be written in ink, or the like. The film ID number may also be printed in an unexposed end portion of film 11 before development, using a character printer, or the like. In these cases, display 124 may be omitted.

Figure 8:
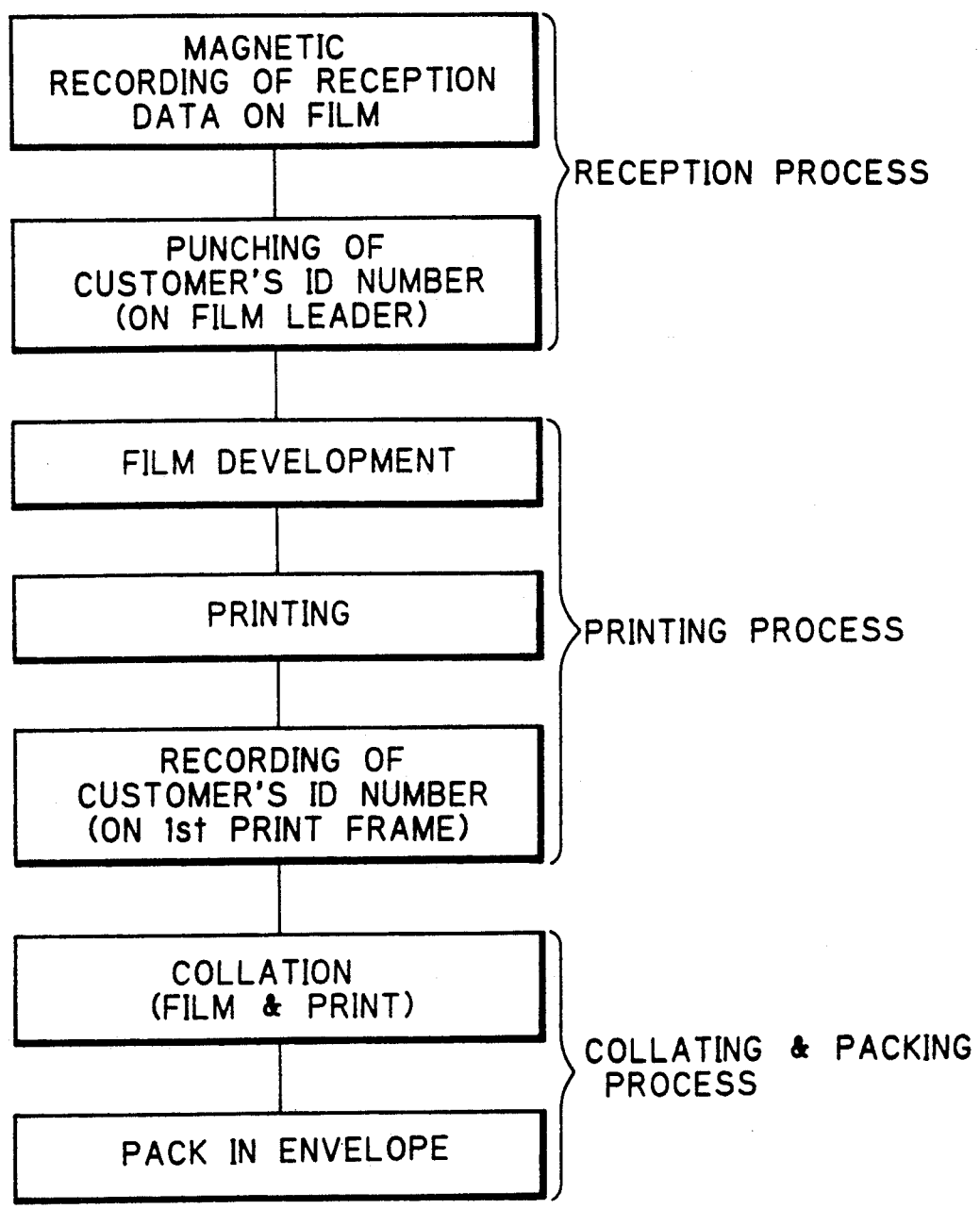
FIG. 8 is a flowchart explaining another procedure of collation between photographic prints and photographic film, according to the second embodiment, wherein a customer's ID number is recorded on a leader portion of each photographic film.
Figure 9:
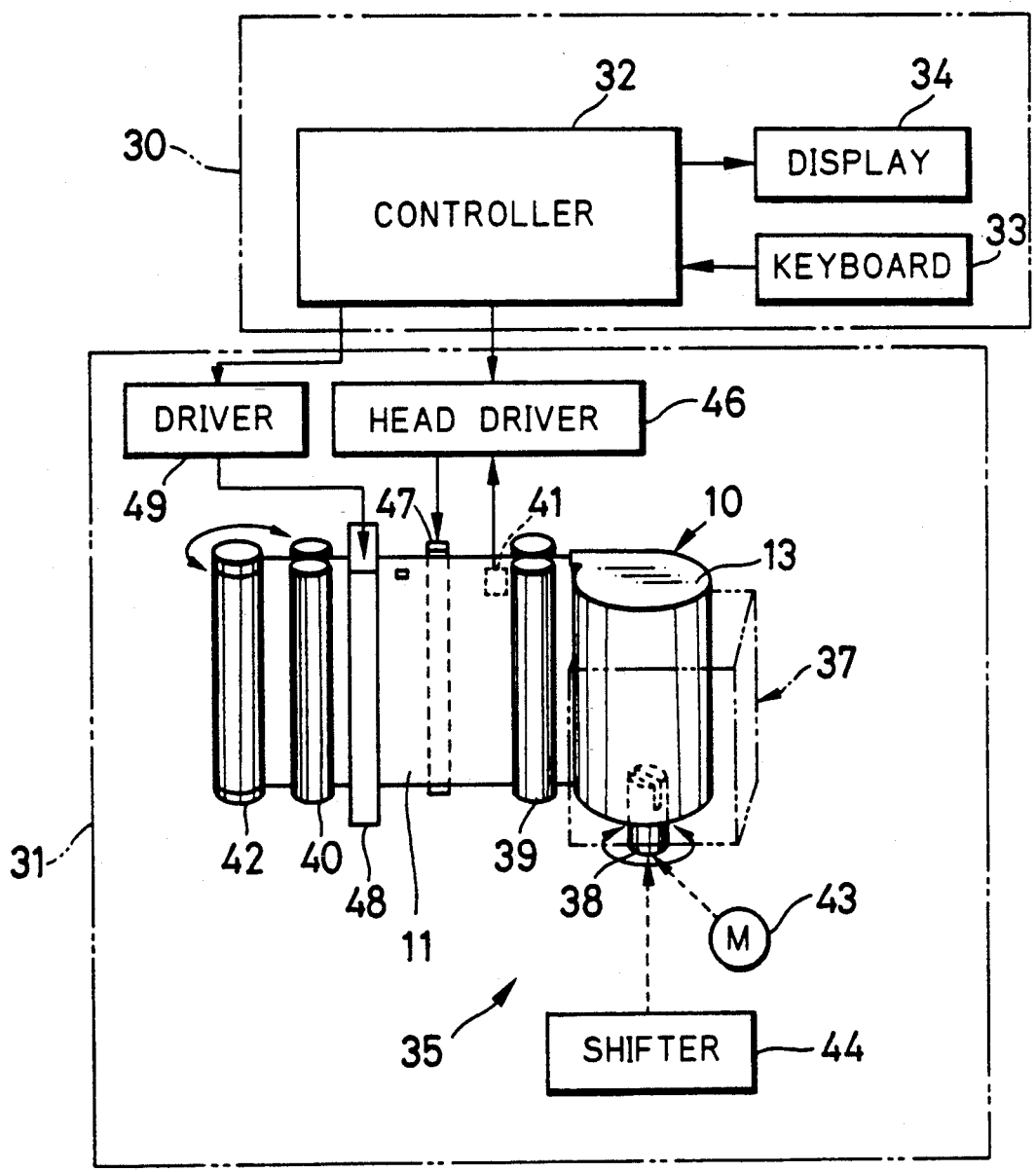
FIG. 9 schematically shows a reception unit for the embodiment of FIG. 8.
Figure 10:
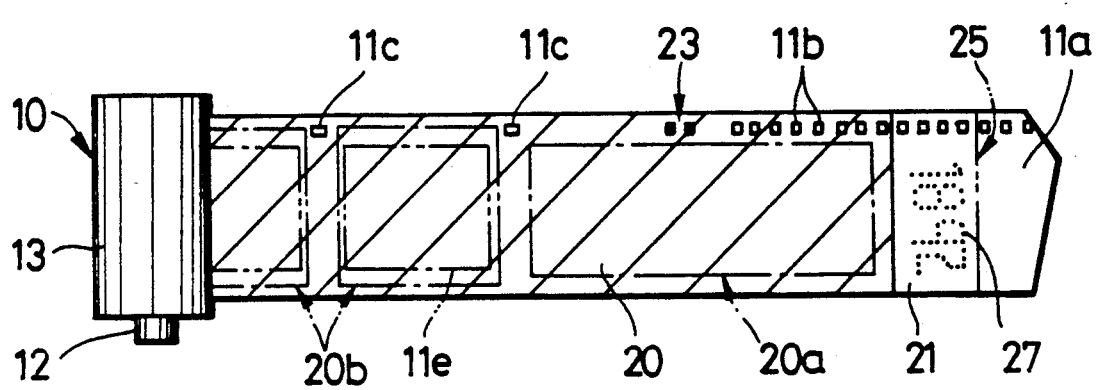
FIG. 10 is a plan view of a film cassette, in which the photographic film has a customer's ID number recorded on the leader portion of the film.

FIG. 8 shows the steps of a process of the second embodiment of the present invention, wherein a customer's ID number is recorded in the form of punch holes in an exposed negative film, so that the operator can see the customer's ID number for collation purposes. Reception unit 35, as shown in FIG. 9, is used for this collating method. Reception unit 35 is provided with punch unit 48 disposed beside magnetic recording head 47. Punch unit 48 is controlled by controller 32 through driver 49. When leader portion 11a of film 11, which is pulled out from cassette shell 13, is passing by punch unit 48, customer ID number 27, in form of punch hole pattern as shown in FIG. 10, is recorded between cutting line 25 and general data recording area 20a. It is to be noted that customer ID number 27 is shown as a 4-digit number for the sake of clarity but may be any appropriate number of digits.

As illustrated in FIG. 8, in the reception process, various reception data including the above-mentioned customer's ID number are recorded by recording head 47 onto recording area 20 of film 11. Simultaneously, punch unit 48 records customer ID number 27 in film leader portion 11a. In a printing process, customer ID number 27 is read from recording area 20, and is recorded on the back surface of a first of photographic prints 98. In a collating and packing process, printed negative film 110 is connected to connecting tape 116, so that printed film 110 can be wound up on spool 114 of storage cassette 113 until only leader portion 11a protrudes from storage cassette 113. Then, the operator compares customer ID number 27 on leader portion 11a, that is, film ID number with customer ID number 27 on the rear of photographic print 98, that is, the print ID number. If these numbers are identical, spool 114 is further rotates so as to wind up the entire length of film 110 into storage cassette 113. Film 110 contained in storage cassette 113 and a set of prints 98 are packed in an envelope having a corresponding customer's ID number.

Figure 11:
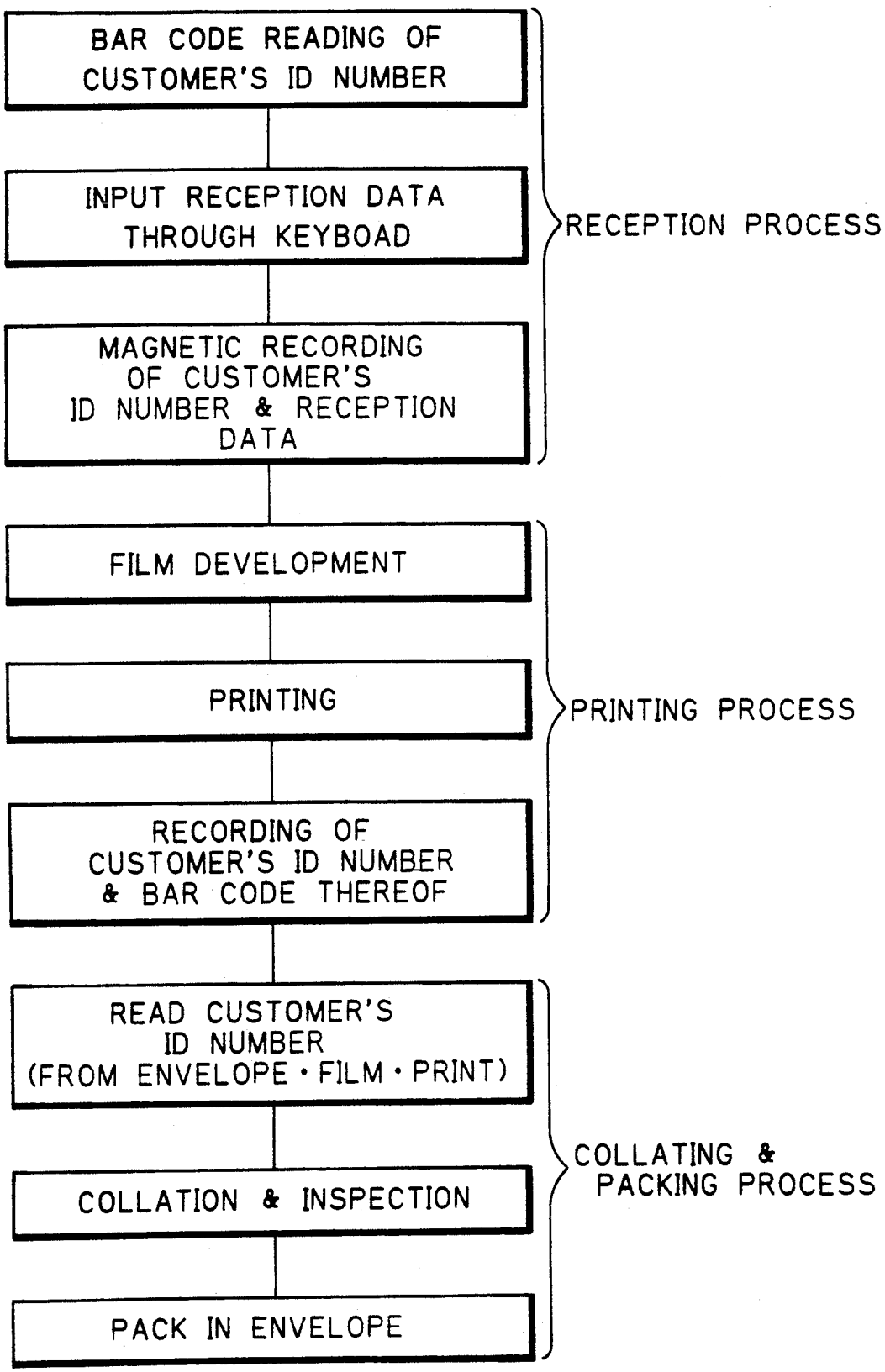
FIG. 11 is a flowchart explaining the third embodiment wherein mechanically readable symbols are used for automatic collation.

Although the above embodiments use a customer's ID number recorded in form of manually readable Arabian numerals for collation, it is possible to use mechanically readable symbols such as optically readable numerals, symbols, characters, or the like, in order to automatically perform collation. FIG. 11 illustrates the steps of a third embodiment wherein not only a customer's ID number but also a mechanically readable customer's ID number bar code are recorded on each envelope and photographic print for automatic collation.

Figure 12:
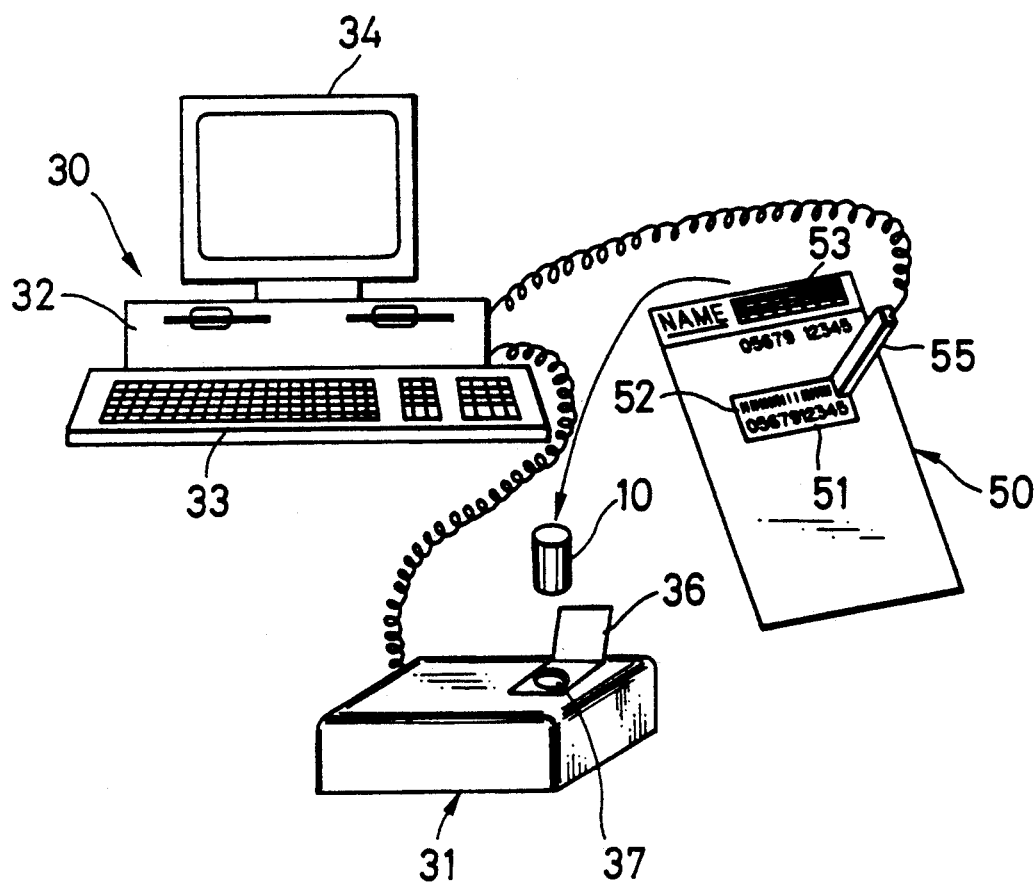
FIG. 12 schematically shows a reception unit for the embodiment of FIG. 11.

FIG. 12 shows a reception unit for automatic collation used in the third embodiment, wherein like parts are designated by the same reference numerals as the embodiment of FIG. 2. Envelope 50 has customer ID number 51 and corresponding ID number bar code 52 previously printed thereon. Received print order entry column 53 is for entering order information.

Customer ID number 51, included in the reception data, is entered in controller 52 with bar code reader 55. Other reception data is entered into controller 32 through keyboard 33 while the operator reads the data written in entry column 53. The construction of the reception unit is similar to that shown in FIG. 3 except that bar code reader 55 is interfaced to controller 32. Film 11, subjected to the reception process of this embodiment, can also be printed using the printer-processor as shown in FIG. 4. During printing, frame number 101 and customer ID number 102, as well as corresponding ID number bar code 52 are printed by printing machine 90 onto the back surface of the first one of a set of prints 98.

FIG. 13 shows a film winding apparatus for the automatic collation system of the third embodiment. Controller 123 is interfaced to bar code reader 130 which reads ID number bar code 107 on photographic prints 98 fed from sorter section 97. Second bar code reader 131 is used to read ID number bar codes 52 on envelopes 50, and is disposed in an envelope reservoir (not shown) so as to read ID number bar code 52 of the uppermost of horizontally stacked envelopes 50 is the reservoir. Keyboard 133 is used to input data such as extra print order data.

Controller 123 compares the numbers detected by respective bar code readers 130 and 131 with each other as well as with a film ID number, which is read by magnetic head 120 from negative film 110 while film 110 is wound up into storage cassette 113. When these three coincide with one another, controller 123 generates a coincidence signal, upon which display device 124 displays an indication that the combination of film, print set and envelope is correct. Then, the operator packs storage cassette 113 containing negative film 110 and a set of prints 98 into envelope 50.

If the three ID numbers do not coincide, controller 123 indicates the inconsistency on display device 124 and, at the same time, sounds alarm 132. If ID number bar code 107 is not readable, display device 124 indicates this also. In this case, because manually readable customer ID number 102 is also recorded on the rear of a first print 98, it is possible to manually read and compare numbers with one another.

If any photographic print 98 is unsatisfactory, it is possible to make a replacement under a corrected condition by inputting the original frame number to controller 123 through keyboard 133. Controller 123 magnetically records this correction printing data in the individual data recording area of negative film 110, allocated to that original frame to be printed again, through magnetic head 120. Therefore, after setting negative film 110 in the printer-processor, the original frame to be printed again is automatically located in the printing position, and is printed according to the corrected exposure condition.

Although photographic prints and negative films are manually packed in respective envelopes in the above embodiments, automatic packing is also possible. For this purpose, a negative film insertion device and a photographic print insertion device are disposed near a packing position, both insertion devices being provided with the above-described bar code readers 130 and 131. At first, collation between the envelope and the negative film is performed so as to insert the negative film in the envelope depending on the result of collation. Then, the collation between the negative film and the photographic prints is performed so as to insert the prints in the envelope depending on the result of collation. However, it is of course possible to insert the negative film and a set of prints concurrently in the envelope.

Each of the above-described embodiments relates to a mini-lab type photofinishing system, but the present invention is applicable to large-scale photofinishing systems as well. In such a case, the same reception process as described above is executed and, thereafter, a plurality of negative films are spliced by a splicer and are wound into a long roll of film. The long film roll is set in a film processor for development. The developed film is then set in an automatic continuous printing apparatus, which is provided with a magnetic head and a printing machine, in the same way as the embodiments described above, so as to print the customer's ID number read by the magnetic head and a bar code corresponding to the ID number onto color paper.

In order to record reception data, such as customer ID number, photo-lab ID number and print order data including print size and print surface type, in magnetic recording areas, it is also possible to write the reception data in a mark sense sheet, and to read the reception data by a mark sheet reader provided in a reception unit, in place of a keyboard and/or a bar code reader. Such a configuration facilitates the entry of reception data in the reception unit.

Although printing machine 90 is used to record a customer ID number on color paper, it is possible to record it as a latent image in a white blank surrounding the print frame, by means of a printing head consisting of a liquid crystal panel, a lens and a lamp.

In addition, OCR characters, mark patterns, KARURA codes, or the like may be used in place of bar codes for collation purposes. Furthermore, it is possible to provide a magnetic recording layer on the rear side of color paper, so that customers' ID numbers can be magnetically recorded on and read out from the magnetic recording layer of color paper for collation.

It is also possible to print film ID numbers in ink onto respective film leader portions by means of an ink-printer. In this case, it is desirable to space the ink-printing position sufficiently apart from an adjacent picture frame, so as to prevent the ink from transferring to the picture frame. Furthermore, it is possible to print film ID numbers on the photosensitive emulsion layer in respective non-recording areas 21. Film ID numbers may be recorded immediately before printing or after printing, as well as in the reception process. For this purpose, a photographic printer should be provided with a puncher or a printing machine near the entrance or exit of the film carrier. Furthermore, negative film may be cut into pieces after printing, so as to be inserted into film sheaths.

What is claimed is:

1. A method of collating a developed photographic film with a set of photographic prints made from said film, said film having a photosensitive emulsion layer for recording a plurality of original frames and a magnetic recording layer for data recording, comprising the steps of:
   recording a customer's first ID data in said magnetic recording layer during reception of a photofinishing order;
   reading said first ID data and recording a customer's second ID data, corresponding to said first ID data, onto at least one photographic print of said set during printing; and
   comparing said first and second ID data with each other, so as to check the correspondence between said set of photographic prints and said photographic film.

2. A method as claimed in claim 1, wherein said magnetic recording layer is disposed on one side of said film and said photosensitive emulsion layer is disposed on the other side of said film.

3. A method as claimed in claim 2, wherein said first ID data is recorded on a portion of said magnetic recording layer disposed on a leader portion of said photographic film.

4. A method as claimed in claim 3, further comprising the step of:
   winding said film on a spool disposed inside a cassette in a light-tight fashion, said film leader portion being propelled out of said cassette by rotating said spool in a direction so as to unwind said photographic film.

5. A method as claimed in claim 4, wherein said film leader portion has a triangular end edge.

6. A method as claimed in claim 4, wherein said first and second ID data are in the form of numbers.

7. A method as claimed in claim 6, wherein said first and second ID numbers are formed by combining an identification code number for a photofinishing agency with a reception number in said photofinishing agency.

8. A method as claimed in claim 6, wherein said second ID number is recorded in the form of visually readable numerals.

9. A method as claimed in claim 8, wherein said second ID number is recorded on a rear surface of said photographic print.

10. A method as claimed in claim 9, wherein said second ID number is recorded on a first print of said set of photographic prints that is made from said photographic film.

11. A method as claimed in claim 10, wherein said second ID number is also recorded on a last print of said set of photographic prints that are made from said photographic film.

12. A method as claimed in claim 10, further comprising the steps of:
    collating said photographic film with said set of prints; and
    packing said photographic film and said corresponding set of said prints in an envelope having a customer's third ID number, corresponding to said first and second ID numbers printed thereon.

13. A method as claimed in claim 12, wherein said winding step occurs after said photographic film is subjected to printing.

14. A method as claimed in claim 13, wherein said reading step and said winding step occur essentially simultaneously.

15. A method as claimed in claim 13, further comprising the step of:
    printing said first ID number onto a peripheral surface of said cassette for collation with a set of said photographic prints.

16. A method as claimed in claim 12, further comprising the step of:
    recording a customer's fourth ID number, in the form of visually readable numerals, on said photographic film, for collation of said photographic film with said set of said photographic prints.

17. A method as claimed in claim 16, wherein said fourth ID number is recorded on said film leader portion.

18. A method as claimed in claim 17, wherein said fourth ID number is recorded as a pattern of holes in said film.

19. A method as claimed in claim 12, further comprising the step of:

recording first and second bar codes corresponding respectively to said second and third ID numbers on at least one of said prints and said envelope, respectively; and reading said first and second bar codes during a collating process.

20. A method as claimed in claim 19, wherein said second bar code is read by a bar code reader so as to record said first ID number on said magnetic recording layer corresponding to said second bar code.

21. A method of collating a developed photographic film with a set of photographic prints made from said film, said film having a photosensitive emulsion layer for recording a plurality of original frames and a magnetic recording layer for data recording comprising the steps of:

recording a customer's first ID data in said magnetic recording layer during a reception process of a photofinishing order;

recording a customer's second ID data, corresponding to said first ID data, on an envelope;

recording a customer's third ID data on said photographic film during said reception process, said third ID data corresponding to said second ID data and being in the form of visually readable symbols;

reading said first ID data and recording a customer's fourth ID data, corresponding to said first ID data, onto at least one print of said set of photographic prints during a printing process; and comparing said second, third, and fourth ID data with one another, so as to check the correspondence between a set of said photographic prints, said photographic film, and said envelope.

22. A method as claimed in claim 21, wherein said first, second, third, and fourth ID data indicate a number.

23. A method as claimed in claim 22, wherein said third ID data is recorded in a leader portion of said photographic film.

24. A method as claimed in claim 23, wherein said customer's ID number is recorded in a pattern of holes in said film.

25. A method of collating a developed photographic film with a set of photographic prints made from said film, said film having a photosensitive emulsion layer for recording a plurality of original frames and a magnetic recording layer for recording data, comprising the steps of:

recording a customer's first ID data on an envelope, said first customer's ID data being in the form of mechanically readable symbols;

reading said first ID data from said envelope and recording a customer's second ID data, corresponding to said first ID data, in said magnetic recording layer during a reception process of a photofinishing order;

reading said second ID data from said magnetic recording layer and recording a customer's third ID data on at least one of said photographic prints, said third ID data corresponding to said second ID data and being indicated by mechanically readable symbols; and comparing said first, second, and third ID data with one another, so as to check the correspondence between a set of said photographic prints, said photographic film and said envelope.

26. A method as claimed in claim 25, wherein said first, second, and third ID data are indicative of a number.

27. A method as claimed in claim 26, wherein said first and third ID data are in the form of bar codes.

* * * * *